(12) United States Patent
Miller et al.

(10) Patent No.: US 8,038,102 B2
(45) Date of Patent: *Oct. 18, 2011

(54) SYSTEM AND METHOD TO CONTROL FLOWFIELD VORTICES WITH MICRO-JET ARRAYS

(75) Inventors: Daniel N. Miller, Bainbridge Island, WA (US); Philip P. Truax, Benbrook, TX (US); Patrick J. Yagle, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/319,585

(22) Filed: Jan. 9, 2009

(65) Prior Publication Data

US 2010/0084514 A1    Apr. 8, 2010

Related U.S. Application Data

(63) Continuation of application No. 10/909,615, filed on Aug. 2, 2004, now Pat. No. 7,510,149.

(51) Int. Cl.
*B64C 21/04* (2006.01)

(52) U.S. Cl. ............... 244/207; 244/204; 244/200.1; 244/204.1; 244/99.12

(58) Field of Classification Search .......... 244/207, 244/204, 200.1, 204.1, 198, 201, 99.12, 130
See application file for complete search history.

(56) References Cited

U.S. PATENT DOCUMENTS

| | | | | |
|---|---|---|---|---|
| 4,697,769 A | * | 10/1987 | Blackwelder et al. | 244/199.2 |
| 5,758,823 A | | 6/1998 | Glezer et al. | 239/4 |
| 6,109,565 A | * | 8/2000 | King, Sr. | 244/207 |
| 6,371,414 B1 | * | 4/2002 | Truax et al. | 244/201 |
| 2002/0190165 A1 | | 12/2002 | Glezer et al. | 244/207 |
| 2009/0108125 A1 | * | 4/2009 | Shmilovich et al. | 244/15 |

FOREIGN PATENT DOCUMENTS

WO    WO 02/072421 A2    9/2002

OTHER PUBLICATIONS

Gordon, Susan et al., Active Flow Control on a Boundary-Layer-Ingesting Inlet; AIAA, 12 pp., Jan. 2004.

* cited by examiner

*Primary Examiner* — J. Woodrow Eldred
(74) *Attorney, Agent, or Firm* — Bracewell & Giuliani LLP

(57) ABSTRACT

The present invention provides a system and method for actively manipulating and controlling aerodynamic or hydrodynamic flow field vortices within a fluid flow over a surface using micro-jet arrays. The system and method for actively manipulating and controlling the inception point, size and trajectory of flow field vortices within the fluid flow places micro-jet arrays on surfaces bounding the fluid flow. These micro-jet arrays are then actively manipulated to control the flow behavior of the ducted fluid flow, influence the inception point and trajectory of flow field vortices within the fluid flow, and reduce flow separation within the primary fluid flow.

18 Claims, 14 Drawing Sheets synthetic jet effector micro-bubble effector

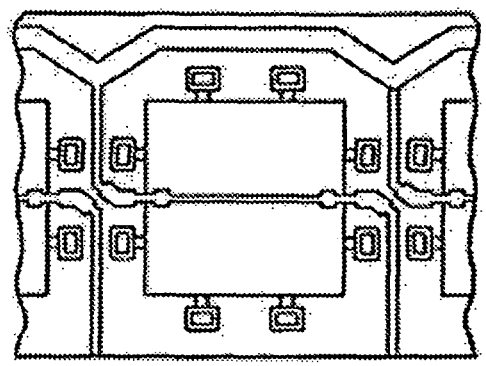
FIG. 11A mems sheer sensor
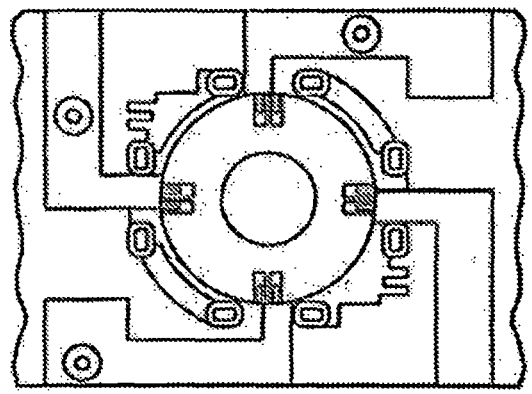
FIG. 11B mems pressure sensor
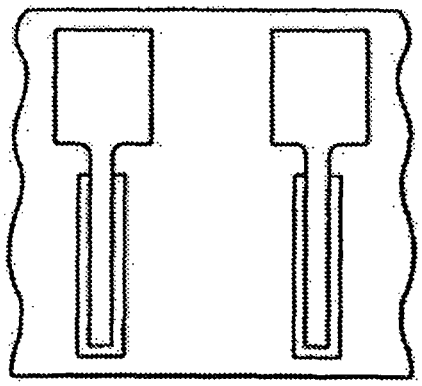
FIG. 11C mems velocity sensor

SYSTEM AND METHOD TO CONTROL FLOWFIELD VORTICES WITH MICRO-JET ARRAYS

CROSS-REFERENCE TO RELATED APPLICATION

This application is a continuation of Ser. No. 10/909,615, filed Aug. 2, 2004 now U.S. Pat. No. 7,510,149.

TECHNICAL FIELD OF THE INVENTION

The present invention relates generally to manipulation of flow field vortices and more particularly, a system and method for manipulating the shedding, size, and trajectory flow field vortices from aerodynamic surfaces with an active array of micro-jets to reduce downstream buffeting and fatigue.

BACKGROUND OF THE INVENTION

Flow field vortices generated by fluid flow over aerodynamic surfaces can buffet and fatigue any downstream structure exposed to these vortices. Vortices can be generated at the fore body of an aircraft or other upstream structure, and damage control surfaces, engines, after body/empennage, nacelles, turrets, or other structures integrated into the airframe. Additionally, these vortices can be ingested within engine air intakes or other like air inlets leading to poor performance and/or stalling of the aircraft engines. Stalling the aircraft engine creates a potentially hazardous condition.

Next generation aircraft, such as blended wing body, compound this problem by incorporating gas turbine inlets with serpentine spines within the air frame. Additionally, exotic aperture shapes for the inlet and outlet may cause excessive propulsion performance losses. These losses emanate from strong secondary flow gradients in the near wall boundary of the airflow, which produce coherent large-scale vortices.

These vortices can not only cause damage to downstream components on an aircraft, but can seriously damage downstream aircraft as well. To avoid these hazardous inter-aircraft interactions, aircraft are normally separated in time and space to avoid wake turbulence and the buffeting effects of this turbulence on downstream aircraft. Sufficient separation in time and space for take-off, cruise, approach and landing help to ensure that an encounter with another craft's wake turbulence is unlikely or sufficiently weak to avoid causing harm.

In the past, adverse flow field vortices were avoided by redesigning the aircraft in order to remove components from the path of flow field vortices. Alternatively, the components in the path of the flow field vortices were structurally hardened or replaced more frequently to avoid failures resulting from these stresses. Placing components, such as engines or control surfaces, in non-optimal positions in order to reduce these stresses often results in reduced vehicle performance. Similarly, adding structural weight to support increased stress loads caused by the flow field vortices also results in reduced vehicle performance.

Another solution employs passive vortex generator veins to mitigate the effects of flow field vortices. However, these veins result in increased weight and reduced performance over the aircrafts entire operating envelope. Vortex generators are small wing like sections mounted on an aerodynamic surface exposed to the fluid flow and inclined at an angle to the fluid flow to shed the vortices. The height chosen for the best interaction between the boundary layer and the vortex generator is usually the boundary layer thickness. The principle of boundary layer control by vortex generation relies on induced mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent replace low momentum boundary layer flow. This is a continuous process that provides a source to counter the natural growth of the boundary layer creating adverse pressure gradients and low energy secondary flow accumulation.

The use of vortex generators to reduce distortion and improve total pressure recovery has been applied routinely. Many investigations have been made in which small-geometry surface configurations effect turbulent flow at the boundary layers. Particular attention has been paid to the provision of so-called riblet surfaces in which an array of small longitudinal rib-like elements known as riblets extend over the turbulent boundary layer region of a surface in the direction of fluid flow over the surface, to reduce momentum transport or drag. Experimental results indicate that net surface drag reductions of up to about 7% can be achieved. However, these structure used to induce vortices are fixed and provide no mechanism to actively manipulate the vortex generation needed to improve a dynamic flow condition.

As computers increasingly leaved fixed locations and are used in direct physical applications, new opportunities are perceived for applying these powerful computational devices to solve real world problems in real time. To exploit these opportunities, systems are needed which can sense and act. Micro-fabricated Electro-Mechanical Systems (MEMS) are perfectly suited to exploit and solve these real world problems.

MEMS offer the integration of micro-machined mechanical devices and microelectronics. Mechanical components in MEMS, like transistors in microelectronics, have dimensions that are measured in microns. These electro-mechanical devices may include discrete effectors and sensors.

Therefore, a need exists for a system and method to shed these flow field vortices to avoid intra-vehicular and inter-vehicular buffeting and fatigue. Furthermore, a need exists for a solution that does not require increased size and weight, or reduced performance.

SUMMARY OF THE INVENTION

The present invention provides a system or method to actively control the size and trajectory flow field vortices with micro-jet arrays that substantially addresses the above-identified needs. More particularly, the present invention provides a system or method for shedding flow field vortices from aerodynamic surfaces with active micro-jet arrays to reduce downstream buffeting and fatigue of components exposed downstream components.

Manipulating the shedding, size and trajectory of flow field vortices from an aerodynamic surface involves placing micro-jet arrays at the aerodynamic surface. The individual micro-jets are oriented generally with the flow direction of the fluid flow. These micro-jet arrays induce secondary flow structures within a boundary layer of the fluid flow. The secondary flow structures manipulate the shedding, size and trajectory of the flow field vortices from the surface. In fact, these secondary flow structures or vortices allow the inception point and trajectory and size of the flow field vortices to be actively influenced. By controlling the inception, size, and trajectory of the flow field vortices, it is possible to reduce buffeting and fatigue of downstream components.

Downstream components may include, but should not be limited to; engine inlets buried within the airframe on next generation aircraft, after body, empennage, missiles, turrets, inlet cowls and wings of an aircraft. By reducing the structural loads imposed on these components, the structure required to manage the stress loads on the components may be reduced as well. When a downstream component is an aircraft engine, potentially hazardous conditions can be avoided by preventing the aircraft engine from stalling due to flow field vortices. Additionally, when the downstream component is a submerged engine or one with a reduced or eliminated pylon, the vortices may manipulate the boundary layer obscured by the engine inlet. Such improvements allow reduced observability, improved control, reduced weight and surface area by reducing the pylon or nacelle.

Although the micro-jet arrays may be located anywhere along the aerodynamic surface, one embodiment locates the micro-jets within a receptive zone along the leading edge of aerodynamic surfaces in order to increase the micro-jet's leverage to influence the inception point and trajectory of the flow field vortices. These micro-jets may employ a continuous flow bled from the primary flow or pulsed flows from micro-jets. MEMS offer the integration of micro-machined mechanical devices and microelectronics. Mechanical components in MEMS, like transistors in microelectronics, have dimensions that are measured in microns. These electro-mechanical devices may include discrete effectors and sensors.

Another embodiment senses the flow conditions over the aerodynamic surface. This information is compared with desired fluid flow conditions to actively and dynamically control the micro-jet arrays in order to achieve a desired fluid flow.

Another implementation provides a method to reduce the effect of flow field vortices generated along the surfaces of an upstream vehicle on a downstream vehicle. This involves placing micro-jet arrays on aerodynamic surfaces of the upstream vehicle. These micro-jet arrays are generally oriented with the mean flow direction of the fluid flow over the upstream vehicle's aerodynamic surfaces. Micro-jet arrays introduce secondary flow structures within the boundary layer of the fluid flow over the upstream vehicle. These secondary flow structures influence the inception point, size, and trajectory of flow field vortices, associated with the upstream vehicle. By properly directing flow field vortices laterally outward from the upstream vehicle, the separation in time and space between the vehicles may be reduced. This may help improve traffic problems encountered in congested airways.

Yet another embodiment provides an aerodynamic surface or control surface operable to manipulate flow field vortices over the aerodynamic surface. This aerodynamic surface comprises micro-jet arrays located substantially upstream of fluid flow over the majority of the aerodynamic surface. These micro-jet arrays introduce secondary flows in the near wall boundary layer to influence or manipulate the inception point, size, and trajectory of flow field vortices over the aerodynamic surface. Sensors detect fluid flow characteristics over the aerodynamic surface. A control system operably coupled to the micro-jet arrays and sensors directs the micro-jet arrays to actively introduce the secondary flows in order to achieve a desired fluid flow over the aerodynamic surface. Although the micro-jet arrays may be located anywhere on the surface, the array's leverage may be increased by placement within a receptive zone or leading edge.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 11A-11C depict various potential sensors;

DETAILED DESCRIPTION OF THE INVENTION

Preferred embodiments of the present invention are illustrated in the figures like numerals being used to refer to like and corresponding parts of the various drawings.

The present invention provides a system and method for manipulating aerodynamic or hydrodynamic fluid flow over a surface that substantially eliminates or reduces disadvantages and problems associated with previously developed systems and methods. More specifically, the present invention provides a system and method to prevent or minimize exposure of downstream components to buffeting or fatigue through the use of very-small-scale arrays of jets (micro-jets). This system and method includes the placement of micro jet arrays on surfaces bounding the fluid flow. These very-small-scale effectors manipulate the flow behavior of the fluid flow, influence the inception point, size, and trajectory of flow field vortices within the fluid flow, and reduce flow separation within the primary fluid flow.

Figure 1:
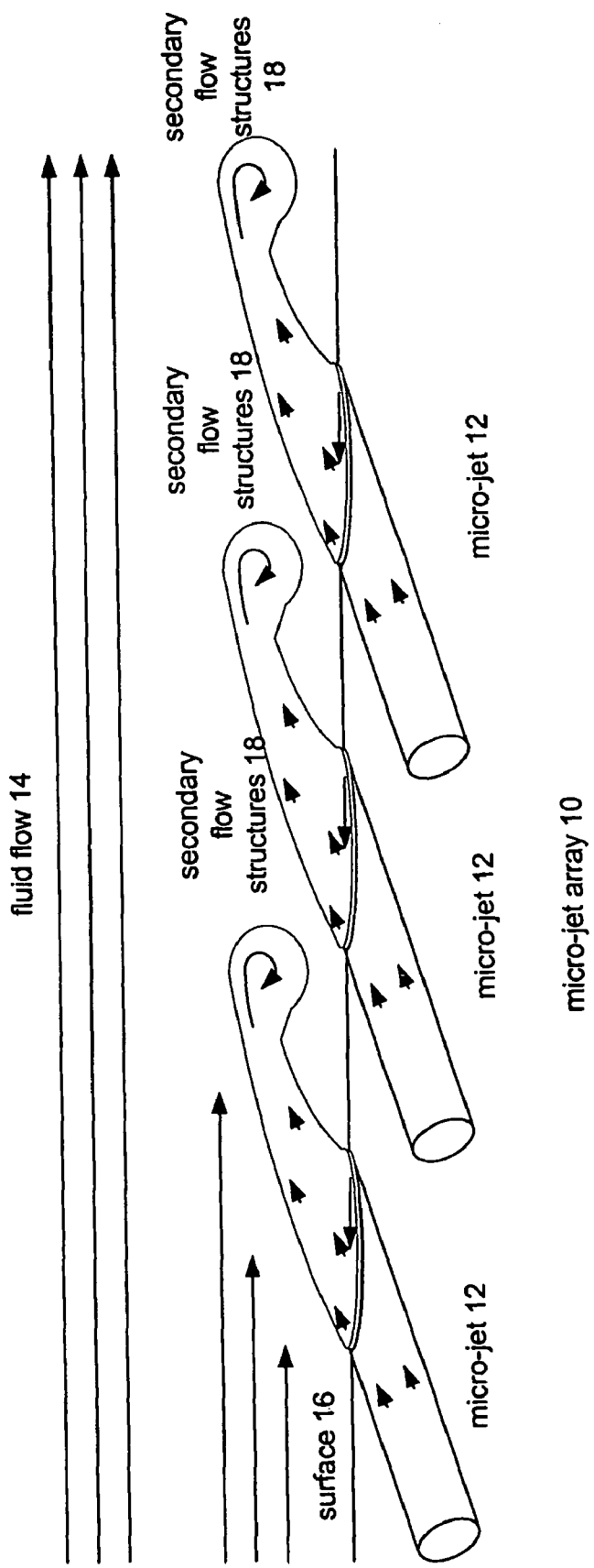
FIG. 1 depicts an array of micro-jets operable to introduce secondary flow structures in accordance with the present invention.
Figure 2:
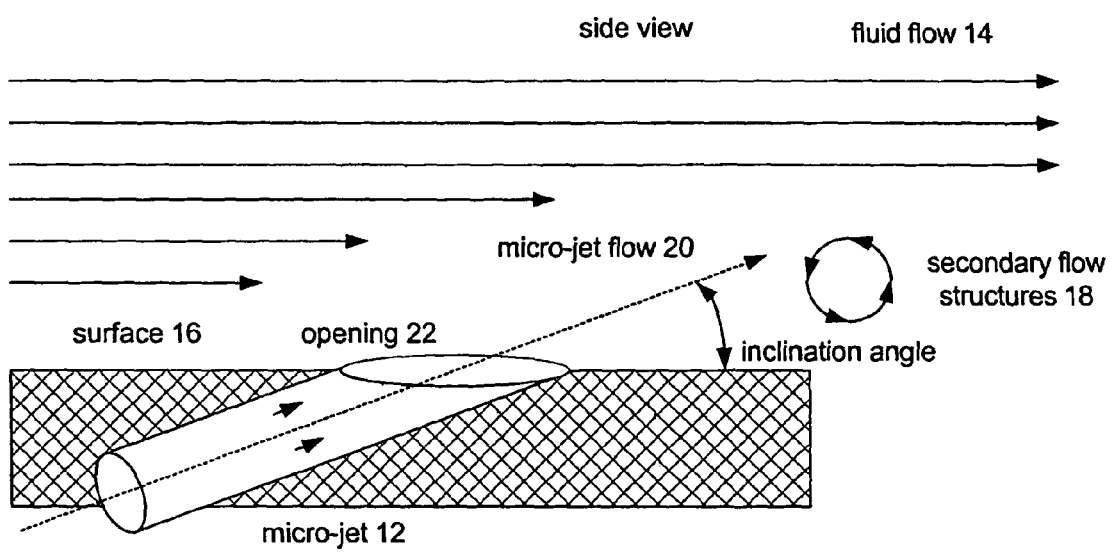
FIG. 2 provides a cross-section view of a micro-jet embedded within an aerodynamic surface in accordance with the present invention.
Figure 3:
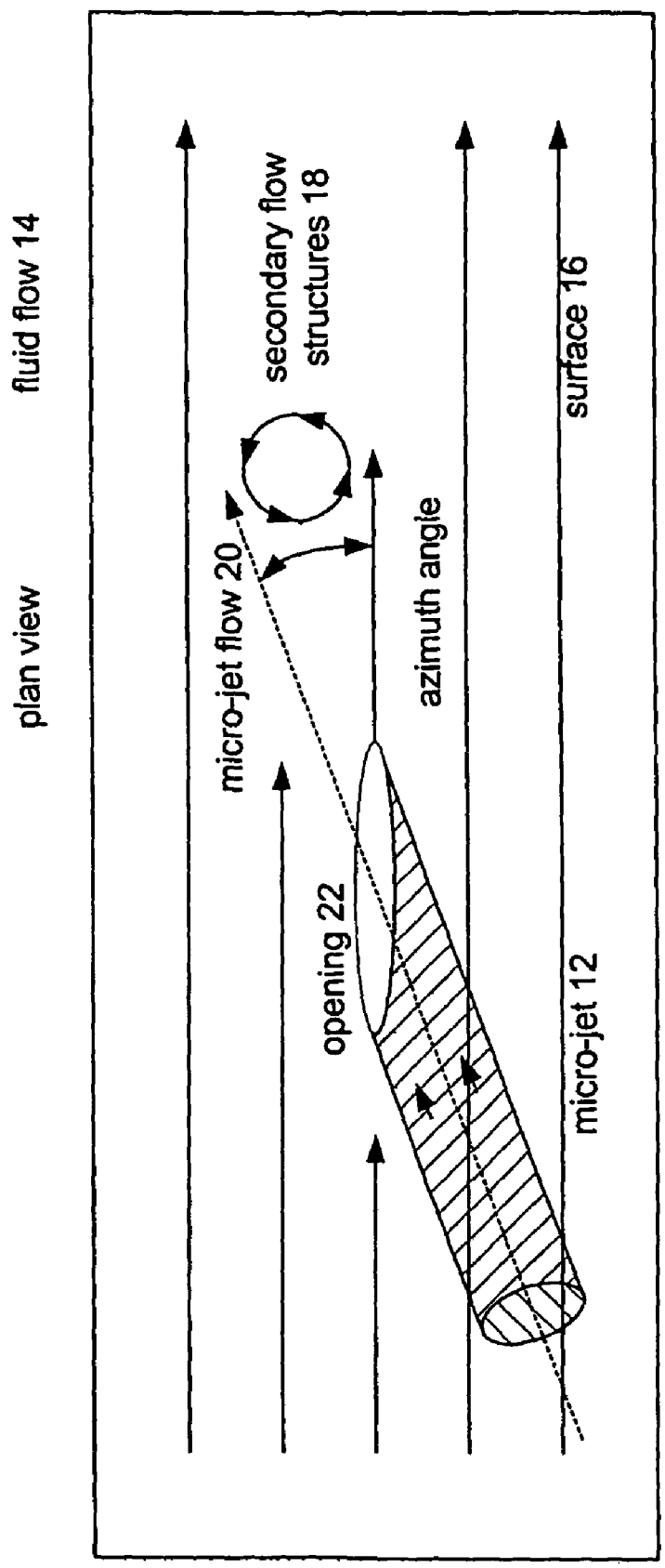
FIG. 3 provides a plan view of a micro-jet embedded within an aerodynamic surface over which a fluid flows in accordance with the present invention.

FIG. 1 depicts an array 10 of micro-jets 12. Micro-jets 12 are embedded in aerodynamic surface 16 over which fluid flow 14 flows. The micro-jets 12 introduce a micro-jet flow 20 that causes secondary flow structures 18 to form in the near wall boundary layer between fluid flow 14 and aerodynamic surface 16. As shown in FIGS. 1, 2, and 3, micro-jets 12 are oriented generally with fluid flow 14. However, the micro-jets 12 generally are not oriented parallel with fluid flow 14. As shown in FIG. 2, micro-jet 12 and its opening 22 are oriented at an inclination angle to produce a micro-jet flow 20 at an acute inclination angle to fluid flow 14. This allows secondary flow structures 18 to be created and not trapped. Thus, micro-jets 12 introduce secondary flow structures 18 that influence the inception point, size, and trajectory of flow field vortices within fluid flow 14. If micro-jets 12 are oriented at greater angles, trapped secondary flow structures may be produced in the boundary layer between fluid flow 14 and aerodynamic surface 16. These trapped secondary flow structures may create a virtual aerodynamic surface.

FIG. 3 shows a top down or plan view of aerodynamic surface 16 wherein micro-jets 12 are oriented to produce a micro-jet flow 20 at an azimuth angle to fluid flow 14. Micro-jet flows 20 induce secondary flow structures 18 within the boundary layer between the fluid flow 14 and aerodynamic surface 16. Secondary flow structures 18 may laterally manipulate the shedding of flow field vortices from aerodynamic surface 16.

Figure 4:
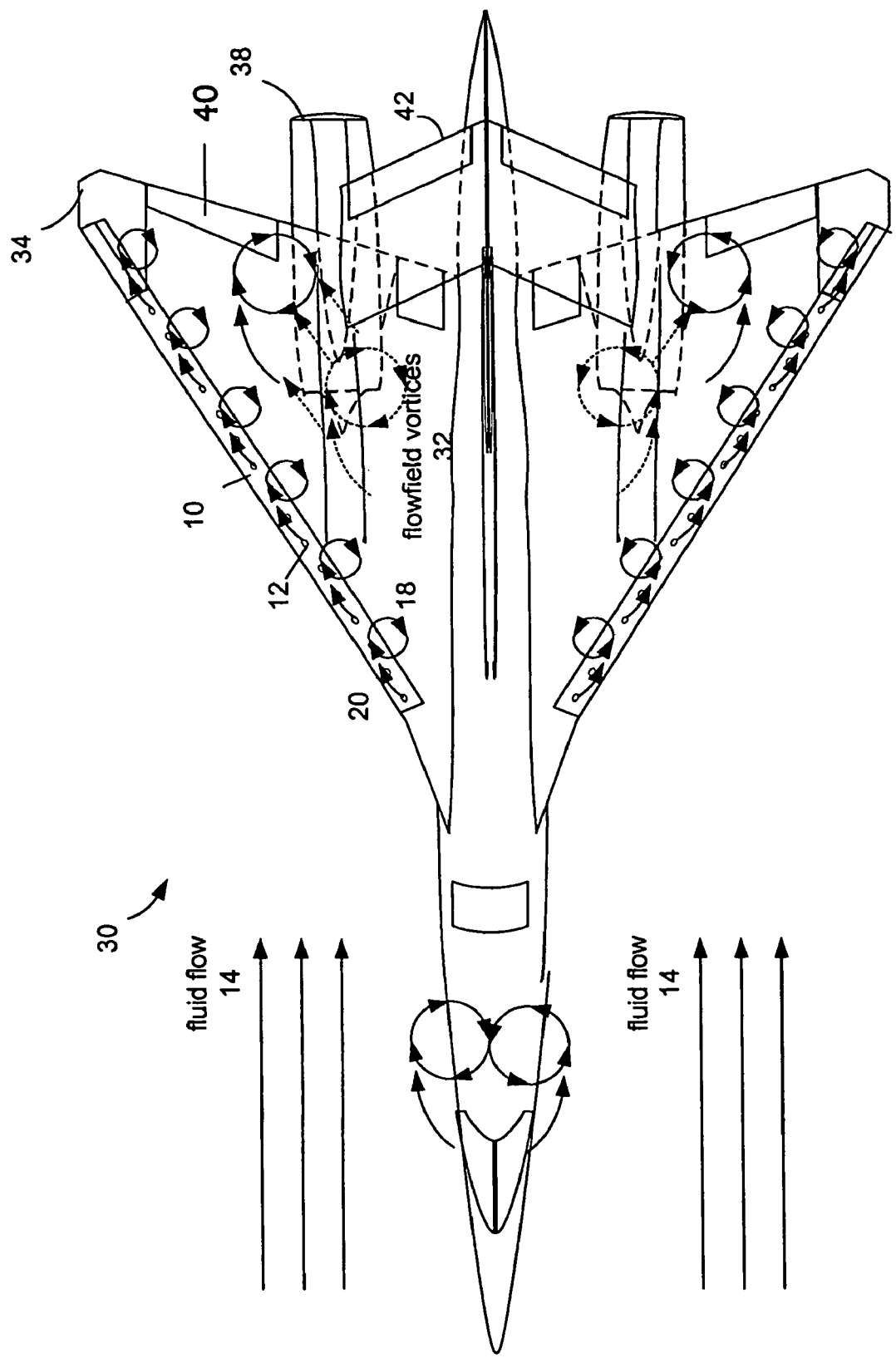
FIG. 4 depicts an aircraft utilizing an array of micro-jets to influence flow-field vortices in accordance with the present invention.

One potential implementation applies these micro-jet arrays to a vehicle, such as but not limited to aircraft. In FIG. 4, aerodynamic surface 16 is located on an aircraft. Other aerodynamic vehicles such as automobiles, trucks, trains, and boats that are sensitive to aerodynamic constraints may have the micro-jet array applied to address aerodynamic concerns and improve the aerodynamic performance of these vehicles.

FIG. 4 depicts aircraft 30 that experiences flow field vortices 32. These flow field vortices are generated from the trailing edge of external components on the aircraft. These flow field vortices can adversely affect downstream components of the aircraft such as but not limited to engines, weapons, fuel or storage nacelles, after body structures, such as the tail or empennage, control surfaces, canards, wings, air intake inlets, such as engine air inlets or sensor air inlets, or other downstream components known to those skilled in the art.

FIG. 4 specifically shows that discontinuities in the aircraft's surface, such as those at the cockpit, can generate flow field vortices 32. Wing 34 is also shown to generate flow field vortices 32. As shown, micro-jet array 10 of micro-jets 12 has been placed on the leading edge of wing 34. These micro-jets introduce micro-jet flows 20 that in turn induce secondary flow structures 18. These secondary flow structures may influence the inception point, size, and trajectory of flow field vortices away from downstream components as shown. Here flow field vortices 32, located over wing 34, if left unimpeded, would buffet empennage 42. However, these vortices are shifted outwards by the effect of the secondary flow structures 18. By reducing the buffeting and fatigue caused on downstream components, the structural requirements for these components may be reduced. Additionally, should the flow field vortices be ingested within an air inlet potentially hazardous stresses can be placed on the aircraft engine resulting in stalling or component failure. For example, turbine blades within the aircraft engine may be severely stressed when ingesting flow field vortices. Thus, the performance of aircraft 30 may be improved significantly by actively shedding the flow field vortices 32 in such a manner to reduce stresses on downstream components. As will be discussed in FIGS. 7A and 7B, actively controlling the vortices may greatly improve the performance of aircraft that locate engines near the upper surface of or submerge the engines within the airframe.

Figure 5:
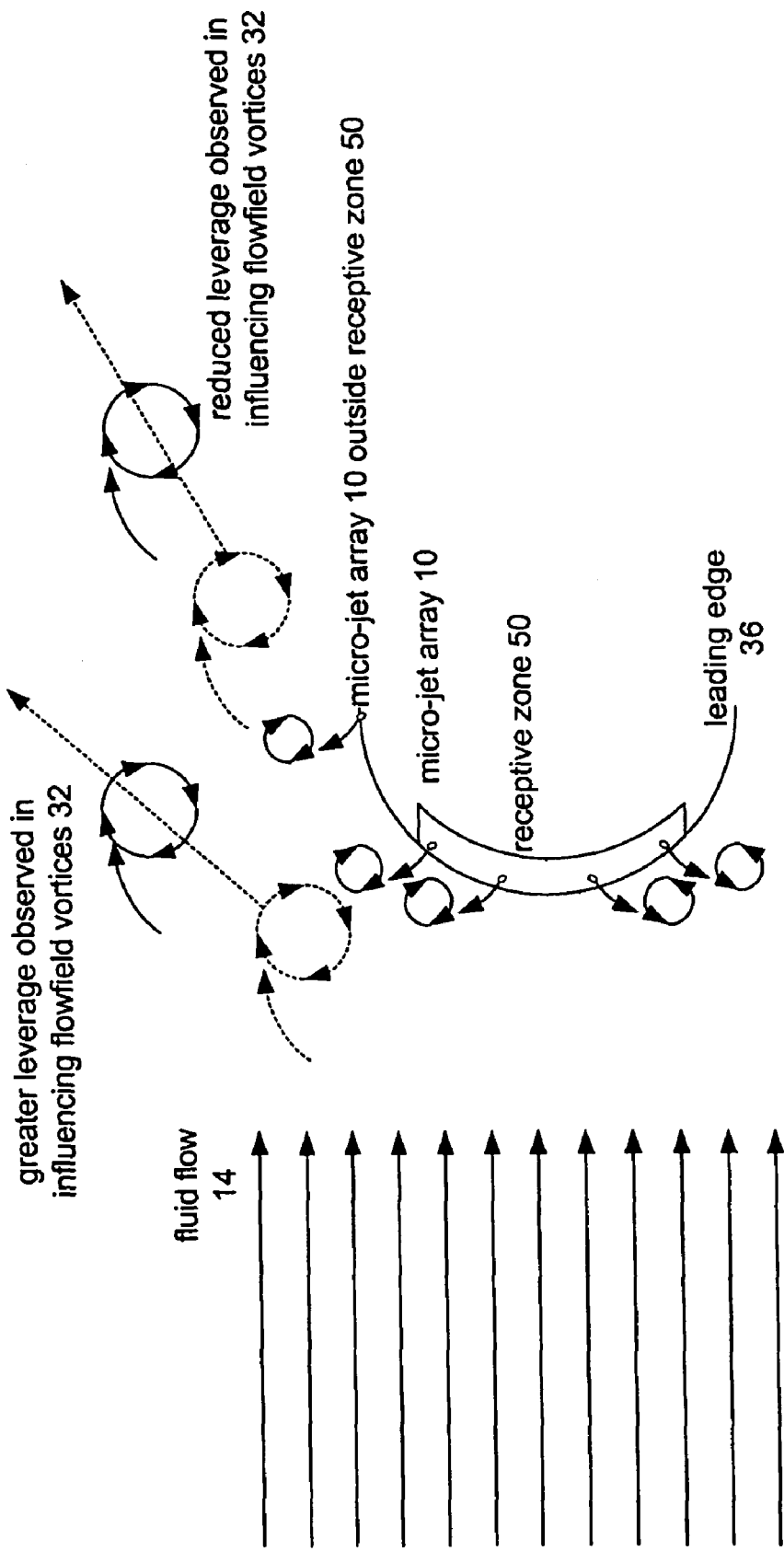
FIG. 5 depicts a cross-section of a leading edge wherein micro-jet arrays are preferentially placed in a receptive zone to influence flow-field vortices in accordance with the present invention.

FIG. 5 shows a cross section of the leading edge of wing 34. Here, the flow field vortices are shown to be placed in a receptive zone 50 along the out edge of leading edge 36. For illustration purposes, a micro-jet array 10 is shown located outside the receptive zone 50. When comparing the influence on flow field vortices between micro-jet arrays 10 located within receptive zone 50 and outside receptive zone 50 one may observe a greater leverage in influencing the inception point, size and trajectory of flow field vortices 32, associated with receptive zone 50. Although micro-jet arrays may be placed at any location within aerodynamic surface 16, it may be preferential to specifically place micro-jet arrays within receptive zones along the leading edges or other locations of the aerodynamic surface in order to realize an increased leverage in influencing flow field vortices away from downstream components.

Figure 6:
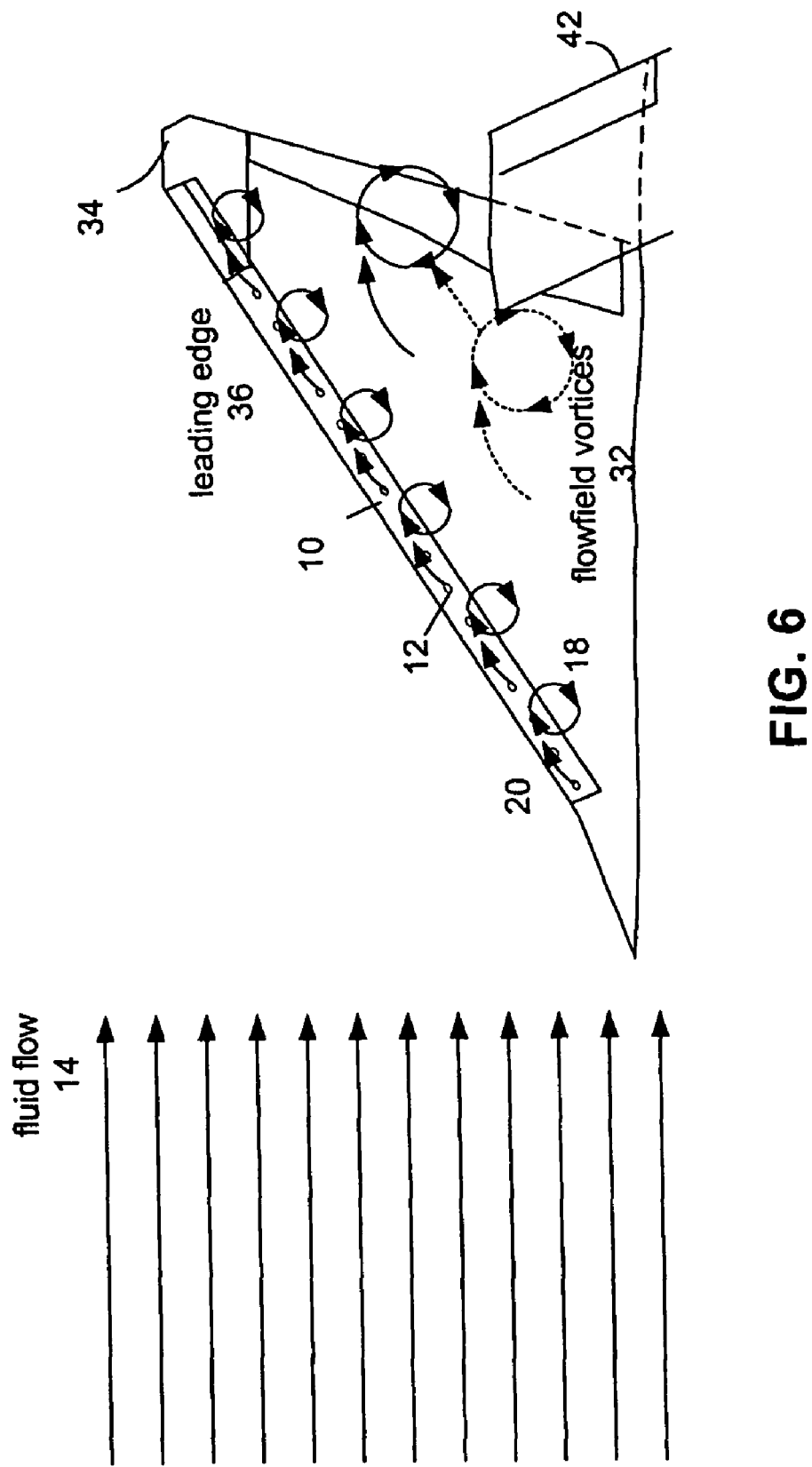
FIG. 6 provides a plan view of an aerodynamic surface wherein micro-jet arrays are placed along the leading edge to influence to realize increased leverage over influencing flow-field vortices in accordance with the present invention.

FIG. 6 depicts a plan view of wing 34 within fluid flow 14. Again one observes that micro-jet array 10 and individual micro-jets 12 are located along the leading edge 36 to provide increased lateral leverage over flow field vortices 32. This increases the ability of secondary flow structures 18 to reduce the negative impacts of flow field vortices 32 on downstream components.

Figure 7A:
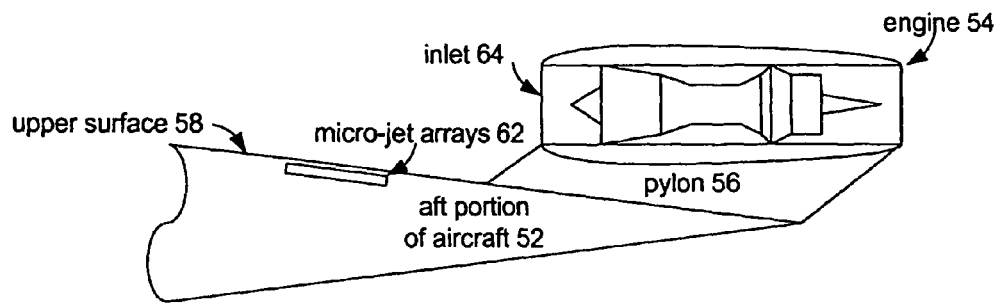
FIGS. 7A, 7B and 7C depict a cross section of a next generation aircraft, such as a blended wing body, having micro-jet arrays operable to minimize the impact of boundary layers on engines located near or submerged within the upper surface of the airframe.
Figure 7B:
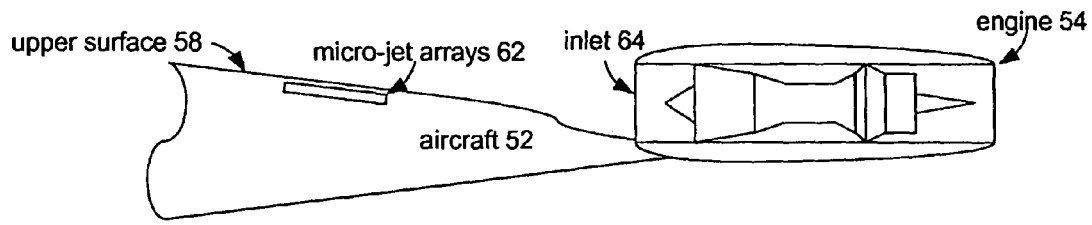
Figure 7C:
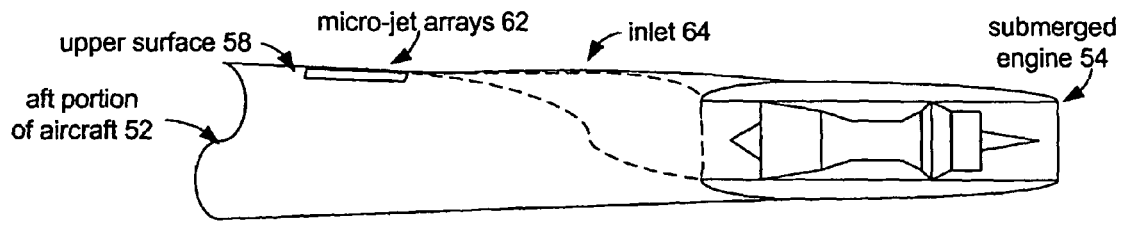

FIGS. 7A, 7B, and 7C depict a cross-section of a next-generation aircraft such as the blended wing body (BWB) where the engine inlets are placed near the upper surface or submerged within the upper surface on the aft section of the aircraft. Here aircraft 52 has the engine 54 located near the aft portion of the aircraft. FIG. 7A depicts engine 54 being mounted on a pylon 56 but located near the upper surface 58 of aircraft 52. Mounting above but near the upper surface avoids some problems associated with ingesting boundary layer flow (low energy boundary layer air) at or near upper surface 58. FIG. 7B depicts an instance where engine 54 is mounted at the surface to eliminate the pylon or nacelle supporting engine 54. By eliminating the pylon or nacelle 56, a smaller surface area is experienced, thus reducing weight and drag of the aircraft 52. FIG. 7C depicts the instance where an engine 54 is submerged within the upper surface 58 of aircraft 52. In the cases presented in FIGS. 7B and 7C, micro-jet arrays 62 are used to actively control and manipulate the boundary layer as seen by inlet 64 of engine 54. These micro-jet arrays 62 may use continuous or pulsating air jets for boundary layer control. These micro-jets manipulate the shedding, size, and trajectory of vorticles as well as the boundary layer to improve the performance of engine 54. Previous solutions may have merely used static vortex generators to manipulate the boundary layer and flow structures ingested by the engines. Although these engines may still experience airflow distortion, the micro-jets located forward of the inlets to engine 54 can significantly reduce distortion of the airflow ingested by these engines. This may reduce the portion of the lower energy boundary layer ingested by an engine located near the surface or submerged within the surface of the airframe. By reducing the amount of low energy boundary layer air ingested by the engine, the drag reduction experienced by ingesting the low energy boundary layer fluid may be reduced. Thus, the present invention can significantly improve the performance of a vehicle such as a next-generation aircraft like the BWB if engine inlet distortion can be controlled.

Every aircraft generates counter-rotating vortices from the trailing edge of wingtips, canards or other aerodynamic structures on the aircraft body. Not only can these flow field vortices adversely impact downstream components within a single aircraft. These flow field vortices pose a potential safety hazard for downstream vehicles or aircraft. This is especially true in areas where dense air traffic and aircraft of different weight classes operate. In order to avoid these hazards to downstream vehicles, upstream and downstream vehicles are separated in time and space.

Figure 8:
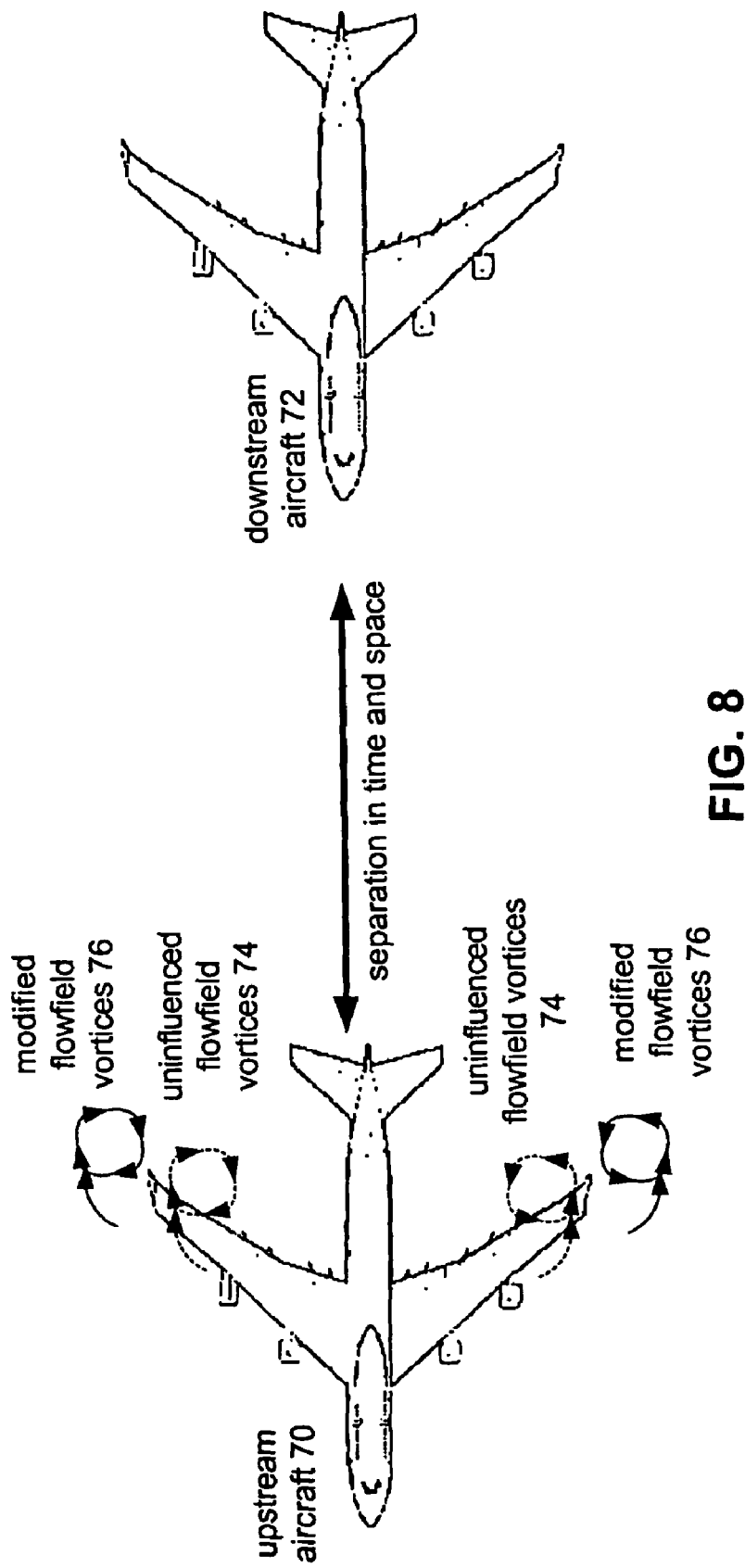
FIG. 8 depicts an aircraft having micro-jet arrays operable to minimize potential safety hazards caused by flow-field vortices created over the aircraft and their impact on downstream aircraft.

FIG. 8 illustrates this potential hazard. Here upstream aircraft 70 generates uninfluenced flow field vortices 74. To avoid potential safety problems between flow field vortices 74 and downstream aircraft 72, upstream aircraft 70 and downstream aircraft 72 are separated in time and space. When micro-jet array arrays 10 are placed onboard the aerodynamic surfaces of upstream aircraft 70, the flow field vortices may be modified as shown by modified flow field vortices 76. By changing the trajectory or strength of the flow field vortices, the separation in time and space between upstream aircraft 70 and downstream aircraft 72 may be reduced. Furthermore the potential safety hazards associated with densely flown routes can be reduced by directing the flow field vortices of aircraft outwards from the longitudinal axis of the aircraft decreasing the longitudinal separation in time and space between aircraft.

Figure 9:
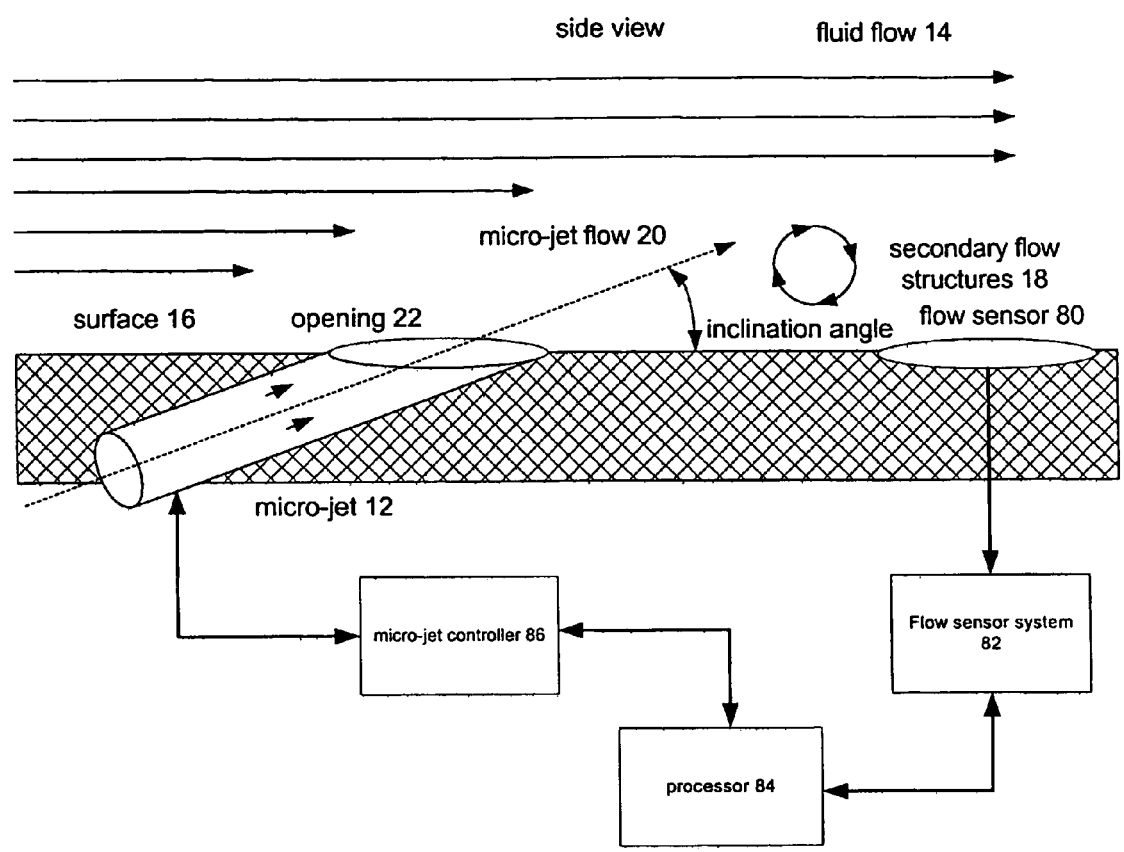
FIG. 9 provides a functional diagram of an aerodynamic surface or control surface operable to sense flow conditions and influence flow-field vortices over the aerodynamic surface in accordance with the present invention.

FIG. 9 depicts an aerodynamic surface or control surface 16. Here arrays 10 of micro-jets 12 are located substantially upstream of fluid flow 14 over surface 16. Micro-jets 12 introduce micro-jet flow 20 to create secondary flow structures 18 in the near wall boundary layer. The secondary flows structures 18 can reduce boundary layer separation over the aerodynamic surface.

These secondary flow structures 18 influence the inception point, size, and trajectory of flow field vortices over aerodynamic surface 16. A control system, such as micro-jet controller 86, may be operably coupled to micro-jets 12. This control system is operable to actively direct micro-jets 12 to introduce secondary flows 18 in order to achieve a desired fluid flow 14 over aerodynamic surface 16.

This active control may be further complemented by a sensing system operably coupled to the micro-jet controllers. This sensing system may employ flow sensors 80 located at various locations along aerodynamic surface 16. These flow sensors are operable to detect the characteristics of fluid flow 14 over aerodynamic surface 16. Sensor outputs are provided to flow sensor system 82 and processor 84. Processor 84 compares the detected fluid flow characteristics over aerodynamic surface 16 with a desired fluid flow characteristic. Then processor 84 will actively direct micro-jet controller 86 to introduce secondary flows 18 to achieve a desired fluid flow over aerodynamic surface 16.

Processor 84 and controller 86 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

As previously stated, these micro-jets and flow sensors may be incorporated in any aerodynamic surface. However, in many instances, more value may be realized by placing these systems within receptive zones of the aerodynamic surface such as the leading edge of the aerodynamic surfaces. The desired fluid flow may avoid having flow field vortices adversely impact downstream components. The desired fluid flow also reduces the fatigue or buffeting of downstream components.

The micro-jets are very-small-scale devices. In some embodiments theses jets are on the order of one-tenth of the boundary layer thickness. These micro-jets may be miniature vortex generators or vortex generator jets fabricated in many ways and applied as an appliqué to or cast into the surface. The micro-jets may be miniature fluidic jets that introduce momentum in the form of micro-jet flows 20. These micro-jet flows may be continuous or pulsed and may be bled from the primary flow associated with an engine. Micro-jets may also be micro fabricated mechanical structures incorporated on or in the aerodynamic surface. These may also be synthetic pulsators. Other similarly sized jets, known to those skilled in the art, may also be used as the micro-jets.

Figure 10A:
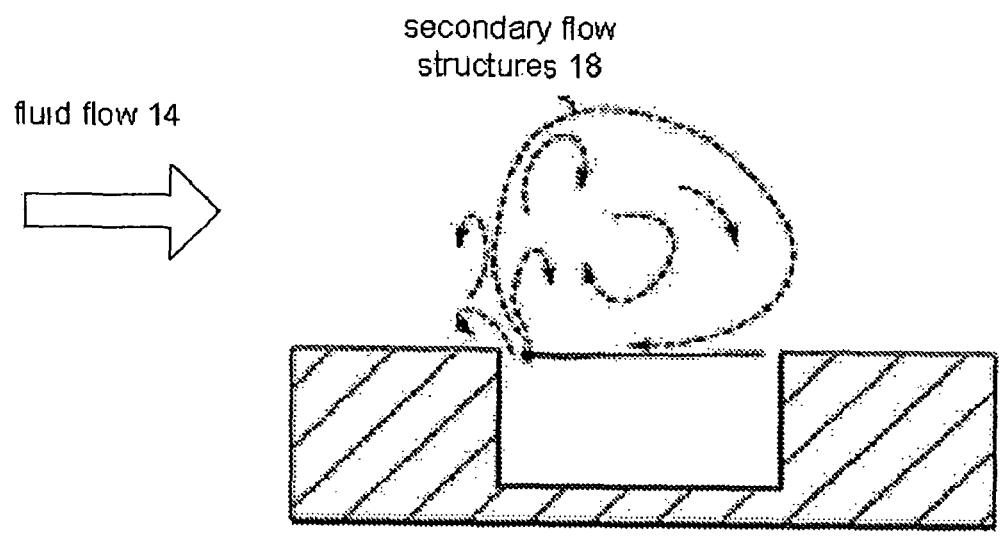
FIGS. 10A-10D depict various potential micro-jets or like devices.
Figure 10B:
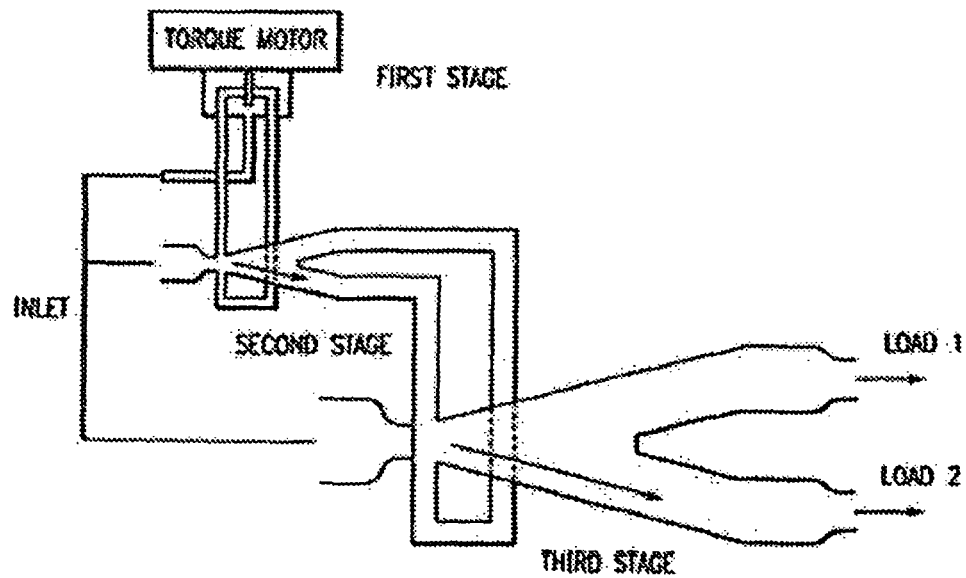

FIGS. 10A-10D illustrate many examples of micro fabricated electro-mechanical structures (MEMS) which may be used as these micro-jets. FIG. 10A depicts a fluidic effector creating secondary flows structures 18 as primary fluid flow 14 passes over fluidic effector. FIG. 10B depicts a pulsing effector. A fluidic oscillator alternates flow between two outflow legs by injecting high pressure on either side of the nozzle orifice. Injecting at Input 1 causes flow to exit the device at Output 2, and injecting at Input 2 causes flow to exit the device at Output 1. The Input flow can come from a like, but smaller device (Second Stage) or from a mechanically driven valve (First Stage).

Figure 10C:
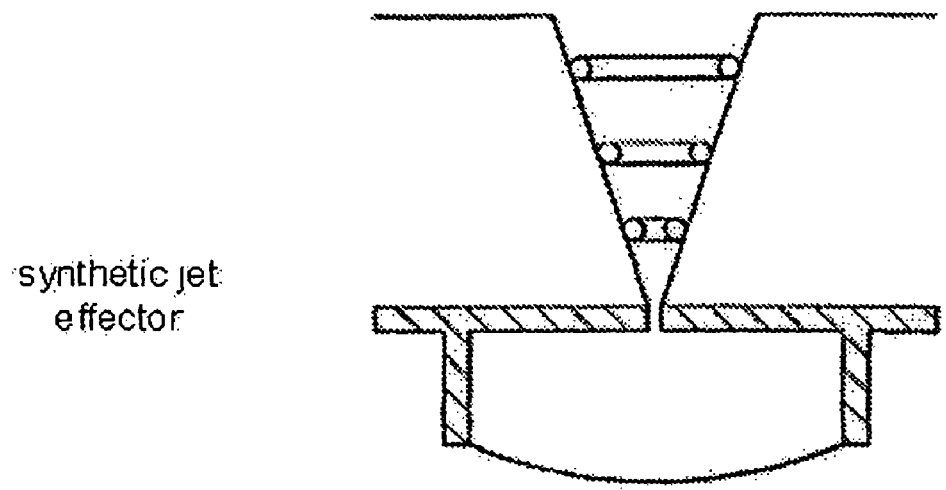
Figure 10D:
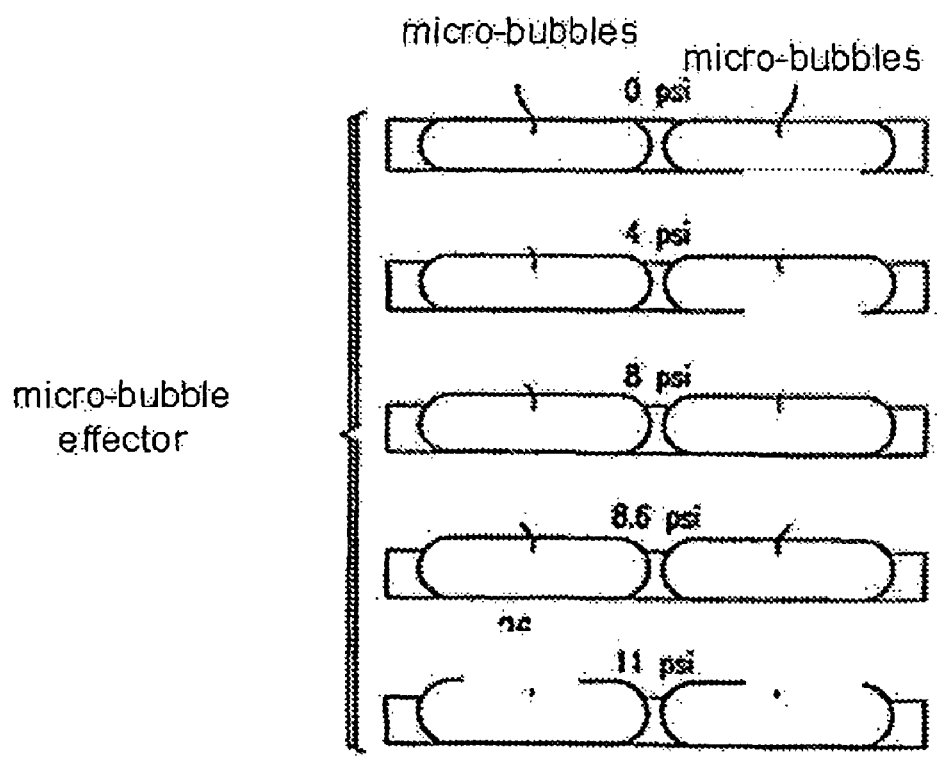

FIG. 10C depicts a synthetic jet effector. This type of effector uses a vibrating diaphragm, which bounds a cavity to generate an air jet. The oscillating surface draws fluid into the cavity from all directions and then expels it in a narrow jet. The resultant pulsed jet has no net mass flow. FIG. 10D presents a micro-bubble effector where micro-bubbles expand based on internal pressure to manipulate secondary flow structures 18. The effectors listed above are examples of possible MEMS devices, which may be used to manipulate primary fluid flow. The fluidic effectors of FIGS. 10A-10D discharge pulses of air and may also be referred to as synthetic pulsators.

Sensor system 82 may receive input from conventional flow sensors or micro fabricated electro-mechanical sensor devices such as those illustrated in FIGS. 11A, 11B and 11C. FIG. 11A depicts sensor 80 as a MEMS sheer sensor. This device functions in a manner similar to a hot-film sheer stress sensor. A small surface flush with the duct wall is maintained at a constant temperature. The heat flex at the duct wall is then measured. This heat flux can be calibrated to sheer stress.

FIG. 11B depicts sensor 80 as a MEMS pressure sensor. FIG. 11C depicts sensor 80 as a velocity sensor. This device functions in a manner similar to hot-wire anemometers. Electric current is passed through a metal element exposed to the fluid flow. The fluid flow convectively cools the element, effecting a change in its electric resistance. This change in resistance can be related to the velocity magnitude at the sensor through calibration. These sensors may be incorporated into surface 16 and communicate to sensor system 82, processor 84 and micro-jet controller 86.

Another embodiment provides an aerodynamic control surface that actively manipulates the inception point, size and trajectory of flow field vortices and/or boundary layer separation over the aerodynamic control surface. This aerodynamic control surface will have micro-jet arrays located substantially upstream of fluid flow over the control surface. These micro-jet arrays introduce secondary flows in the near wall boundary layer. These secondary flows reduce boundary layer separation over the aerodynamic control surface. By reducing boundary layer separation, the overall size of the control surface as well as support for the control surface may be reduced. In an aircraft, for example, this may result in significant weight reduction as the structural requirements associated with the aircraft control surfaces and their control systems may be reduced. A control system operably coupled to the micro-jet arrays may direct micro-jet arrays to introduce secondary flows in order to achieve desired fluid flow over the control surface.

Another embodiment takes the form of an aircraft such as that depicted in FIG. 4, 7 or 8. Here, the aerodynamic surfaces of the aircraft are operable to manipulate flow field vortices over the aircraft's aerodynamic surfaces. This reduces buffeting of downstream structures and components of the aircraft. This involves utilizing the aerodynamic surfaces that have micro-jet arrays 10 located substantially upstream of the fluid flow over the aerodynamic surface. These micro-jet arrays introduce secondary flows in the near wall boundary layer to affect an inception, point, size, or trajectory of the flow field vortices over the aerodynamic surfaces. An active control system may operably couple to the micro-jet arrays to direct the operation of the micro-jets. Thus, it is not always necessary to have the micro-jet arrays on. Depending on the angle of attack and velocity of the aircraft, the flow field vortices may not always cause fatigue and buffeting of downstream components.

Figure 12:
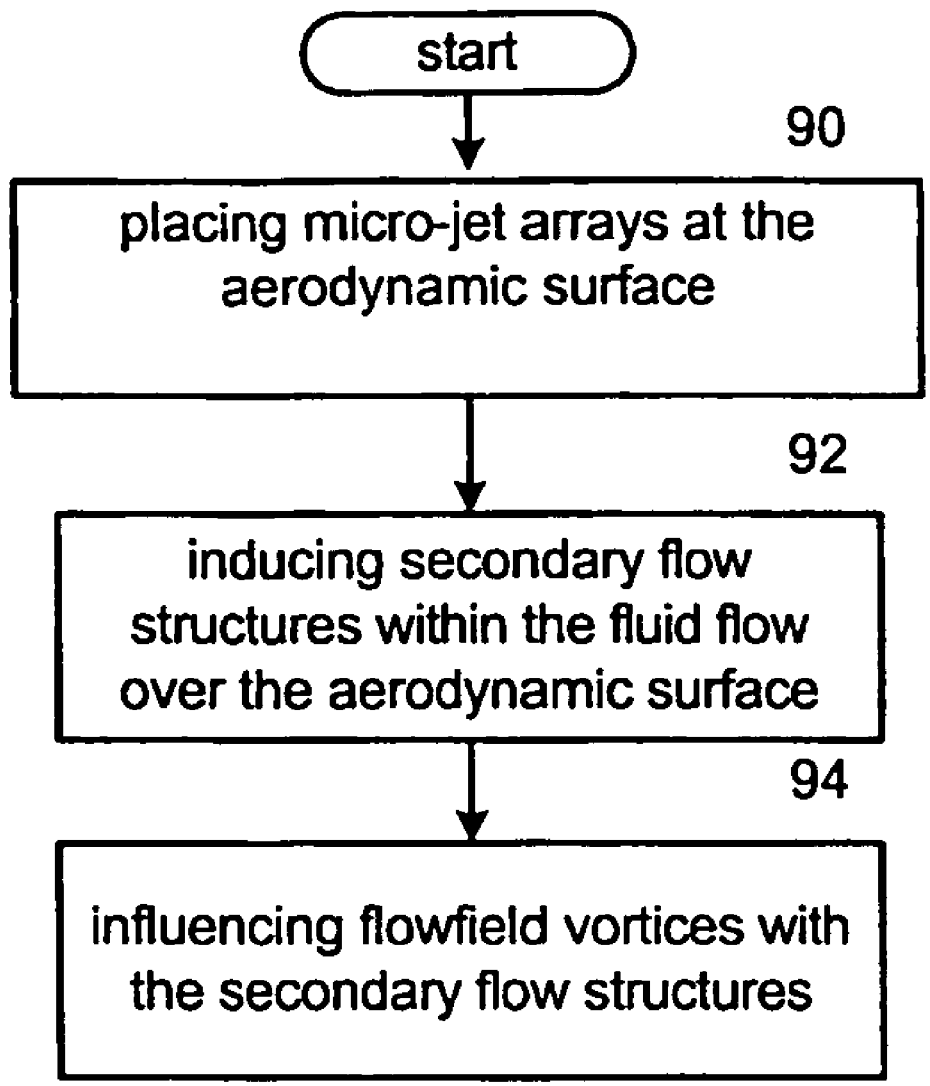
FIG. 12 provides a logic flow diagram illustrating one embodiment of the present invention.

FIG. 12 provides a logic flow diagram illustrating a method associated with the present invention. Generically, this method involves placing the micro-jet arrays at the aerodynamic surface in step 90. Then, in step 92, secondary flow structures are induced within the fluid flow over the aerodynamic surface by the micro-jet arrays. In Step 94, flow field vortices within the fluid flow over the aerodynamic surface are influenced by the secondary flow structures. The secondary flow structures may specifically influence the inception point and trajectory of the flow field vortices.

Figure 13:
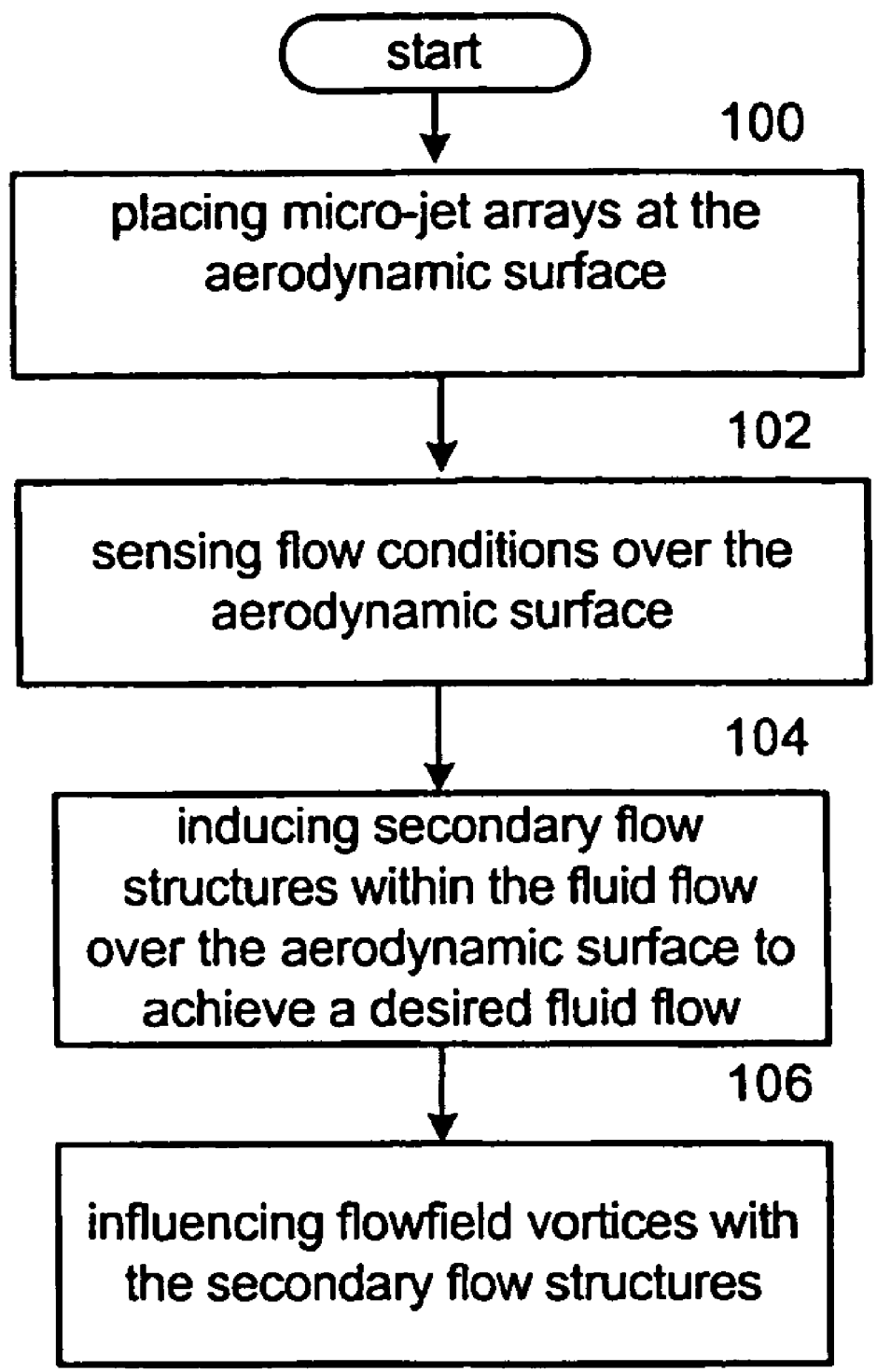
FIG. 13 provides a logic flow diagram depicting one methodology for influencing flow-field vortices in accordance with the present invention.

FIG. 13 provides a second logic flow diagram depicting the methodology associated with the present invention. In step 100, micro-jet arrays are placed at the aerodynamic surface. Additionally, sensors at the aerodynamic surface sense flow conditions over the aerodynamic surface in step 102. The sensed flow conditions are used to direct micro-jet arrays placed in Step 100 to induce secondary flow structures in step 104 within the fluid flow in order to achieve the desired fluid flow. As in FIG. 11, the induced secondary flow structures influence the flow field vortices within the fluid flow in Step 106.

The present invention enables new and improved designs of low-observable tactical aircraft by allowing unconventionally aerodynamic shapes. Low-observable in part takes into consideration such as detection by radar and the radar cross-section associated with a low-observable aircraft.

One method to detect aircraft involves the use of radar. However, not all objects or aircraft reflect the same amount of radar waves, as is known by those skilled in the art. In a low-observable aircraft one would want to reflect as little radar energy as possible to a radar receiver, enabling the plane to go undetected at closer ranges. The amount of radar energy that is reflected by an object can be defined by its radar cross-section. To define the radar cross-section of a target, one calculates the size of a sphere, which would reflect the same amount of radar energy as the aircraft that was measured. The radar cross-section in the square meters is then the area of a circle of the same diameter as the imaginary sphere.

Radar cross-section is not necessarily defined by aircraft size, but is more closely related to its design and construction. Curved surfaces reflect energy in many directions. Therefore, curved surfaces have been historically avoided in favor of flat surfaces. Flat surfaces, like the facets of a diamond, reflect energy in the limited directions of the designers' choice-namely, away from detecting receivers for a low observable aircraft. As the computation power of computers have increased designers need no longer be limited to faceted surfaces, rather surfaces, including curved surfaces, may be modeled and optimized to minimize the amount of radar energy reflected to a detecting receiver.

One problem source of radar signatures from aircraft has been associated with the engine ducting. In some instances this has been used as an identifier of the aircraft. Modern radars can look down engine inlets to bounce returns off the highly reflective compressor blades (and in many cases identify them by counting the rotating blades). Radar is not the only method of aircraft detection. To reduce their vulnerability to heat-seeking detection systems, low-observable aircraft may use slit-like inlets and exhausts. Exhaust may emerge in cool, diffuse fans rather than hot, concentrated streams.

These devices may be used in a low-observable aircraft surfaces or unconventionally shaped surfaces. In addition to aircraft applications, static architectural structures such as buildings, bridges, and towers may incorporate these devices in their aerodynamic surfaces. Unconventionally shaped surfaces may include aggressive duct offsets. The enhancement of fluid flow 14 over these unconventionally shaped surfaces can help to minimize the size, weight, and structural support required by these surfaces.

Finally, the low-observable requirements for inlet and exhaust ducting pose significant challenges. The challenges require high aspect ratio and exotic aperture shaping of ducts or top-mounted inlets for ducts. Fluid flow control can be used to mitigate any performance impact on the aircraft. Additionally, attack geometries and sensing internal and external flow conditions at the aircraft and actively manipulating the fluid flow conditions at the aircraft to achieve desired fluid flow conditions at the aircraft will enhance dynamic conditions of the aircraft in flight. Fluid flow may be manipulated to meet several objectives including: (1) reduced component fatigue, (2) stable fluid flow within an internal ducting system, and (3) stable fluid flow external to the aircraft in dynamic geometries.

Additionally, flow control can reduce cyclic fatigue of components located within fluid flow 14. Stress peak amplitudes experienced by a component within the fluid flow for a normal flow can be greatly reduced by reducing or eliminating interactions between flow field vortices and structural components.

The present invention may be used to improve flow behavior in a hydrodynamic application. This may minimize head loss in a piping system, reduce flow noise within a piping system or over a submerged structure or to control and manipulate hydrodynamic flow about a watercraft for direction and thrust control.

Further embodiments of the present invention may include air-handling units such as HVAC systems, chemical processors, automobile air intake manifold or biomedical applications. However, the present invention should not be limited to these applications.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method to manipulate shedding of flow field vortices from an external aerodynamic surface of an aircraft, comprising:

placing at least one array of synthetic pulsators on and upstream from a majority of airflow over the external aerodynamic surface, wherein each of the synthetic pulsators has an orifice for ejecting jet pulses through the orifice, wherein each of the synthetic pulsators is inclined in an aft direction at an acute angle relative to the aerodynamic surface and also at an acute azimuth angle relative to a longitudinal axis of the aircraft such that each of the synthetic pulsators is inclined laterally outward from the longitudinal axis of the aircraft, and each of the pulsators being a no net mass flow device; and injecting jet pulses through the orifices of the synthetic pulsators in a downstream direction and at the said azimuth, angle relative to the longitudinal axis of the aircraft, thereby inducing secondary flow vortices that rotate generally parallel to the aerodynamic surface within a boundary layer of the air flow to manipulate the shedding of the flow field vortices from the external aerodynamic surface.

2. The method of claim 1, wherein placing the at least one array of synthetic pulsators comprises placing the synthetic pulsators upstream of and not within an engine inlet of the aircraft.

3. The method of claim 1, wherein the secondary flow vortices direct the flow field vortices away from an engine inlet of the aircraft.

4. The method of claim 1, wherein placing at least one array comprises placing at least some of the synthetic pulsators along a leading edge of the aerodynamic surface.

5. The method of claim 1, wherein the aerodynamic surface comprises a wing, and wherein the method further comprises:

placing the at least one array of synthetic pulsators adjacent a leading edge of the wing.

6. The method of claim 5, further comprising:

detecting air flow characteristics over the external aerodynamic surface with a sensing system that is coupled to the control system; and comparing the detected air flow characteristics over the external aerodynamic surface to the desired air flow over the external aerodynamic surface with the control system, and directing the synthetic pulsators to introduce the secondary flow vortices to dynamically control the shedding of flow field vortices from the external aerodynamic surface to achieve the desired air flow over the external aerodynamic surface based on the comparison.

7. The method of claim 1, wherein:

the aircraft comprises a blended wing body having an engine on an aft section of the aircraft; and placing the at least one array of synthetic pulsators comprises placing the at least array on an upper surface of the aft section of the aircraft forward from an inlet of the engine.

8. The method of claim 1, wherein the synthetic pulsators comprise micro fabricated mechanical structures.

9. The method of claim 1, wherein the aerodynamic surface comprises a wing, and the aircraft has an engine inlet aft of at least part of a leading edge of the wing, and wherein the method further comprises:

placing the at least one array of synthetic pulsators along substantially a full length of a leading edge of the wing.

10. The method of claim 1, wherein the secondary flow vortices are co-rotating with the flow field vortices.

11. The method of claim 1, wherein manipulating the inception point, trajectory and size of the flow field vortices directs the flow field vortices away from a downstream component and reduces fatigue effects on the downstream component.

12. The method of claim 11, wherein the downstream component comprises at least one component selected from the group consisting of: nacelles; empennage; control surfaces; inlets; pods; and a second downstream aircraft.

13. The method of claim 1, wherein the synthetic pulsators are aligned to introduce desired secondary flow vortices substantially parallel to a direction of the air flow over the external aerodynamic surface.

14. An aircraft, comprising:

an external aerodynamic surface;

at least one array of synthetic pulsators located upstream of a majority of air flow over the external aerodynamic surface, each of the synthetic pulsators having an orifice for ejecting a jet pulse through the orifice, each of the synthetic pulsators having a synthetic pulsator axis that is inclined in an aft direction relative to the portion of the external aerodynamic surface on which each synthetic pulsator is mounted, and the synthetic pulsator axis of each of the synthetic pulsators is positioned at an acute azimuth angle relative to a longitudinal axis of the aircraft, such that each synthetic pulsator is directed laterally outward from the longitudinal axis of the aircraft as the said azimuth angle, and each of the synthetic pulsators being a no net mass flow device; and a control system operably coupled to the at least one array of synthetic pulsators, wherein the control system is operable to control ejection of the jet pulses from the at least one array of synthetic pulsators.

15. The aircraft of claim 14, further comprising:

a sensing system operably coupled to the control system, wherein the sensing system is operable to detect air flow characteristics over the external aerodynamic surface, and wherein the control system compares the detected air flow characteristics over the external aerodynamic surface to the desired air flow over the external aerodynamic surface; and directs the at least one array of synthetic pulsators to introduce secondary flows in order to achieve the desired air flow over the external aerodynamic surface based on the comparison.

16. The aircraft of claim 14, wherein the aerodynamic surface comprises a wing, and the at least one array of synthetic pulsators is located along a leading edge of the wing.

17. The aircraft of claim 14, wherein the aircraft has an engine inlet, and the at least one array of synthetic pulsators is forward of the inlet.

18. A method to manipulate shedding of flow field vortices from an engine inlet of a blended wing body aircraft, comprising:

placing at least one array of synthetic pulsators on an external aerodynamic surface of the aircraft forward of the engine inlet, wherein each of the synthetic pulsators has an orifice for ejecting a jet pulse through the orifice, wherein each of the synthetic pulsators has an orifice axis that is inclined in an aft direction relative to the aerodynamic surface and also oriented at an acute azimuth angle that extends laterally outward relative to a longitudinal axis of the aircraft; and injecting jet pulses through the orifices of the synthetic pulsators in a downstream direction and at the said azimuth angle relative to the longitudinal axis of the aircraft, thereby inducing secondary flow structures within a boundary layer of the air flow to manipulate the shedding of flow field vortices from the external aerodynamic surface and prevent the flow field vortices from entering the engine inlet.

* * * * *